MOTOR VEHICLE DRIVE ASSEMBLIES
Filed March 31, 1961 3 Sheets-Sheet 1
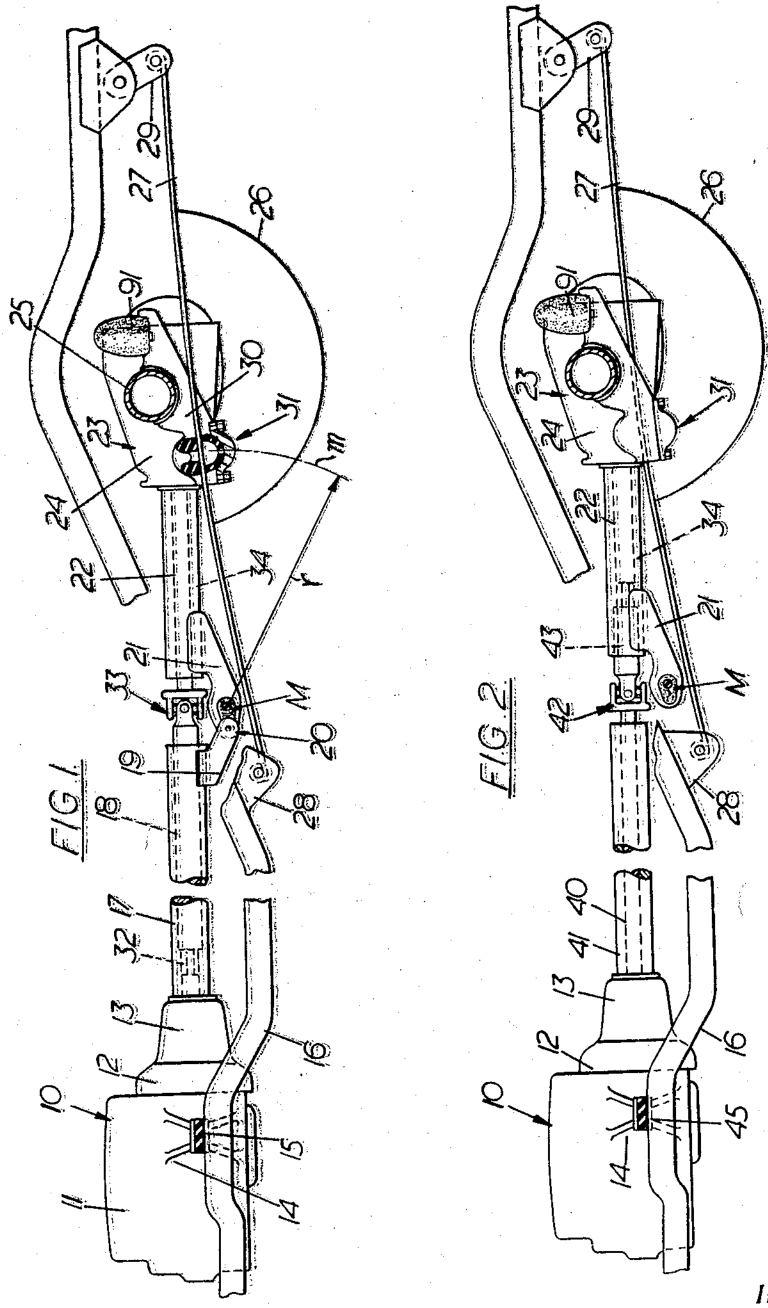
Inventors
Jakob Adloff &
Otto Haertel
BY W. F. Wagner
Attorney MOTOR VEHICLE DRIVE ASSEMBLIES
Filed March 31, 1961 3 Sheets-Sheet 2
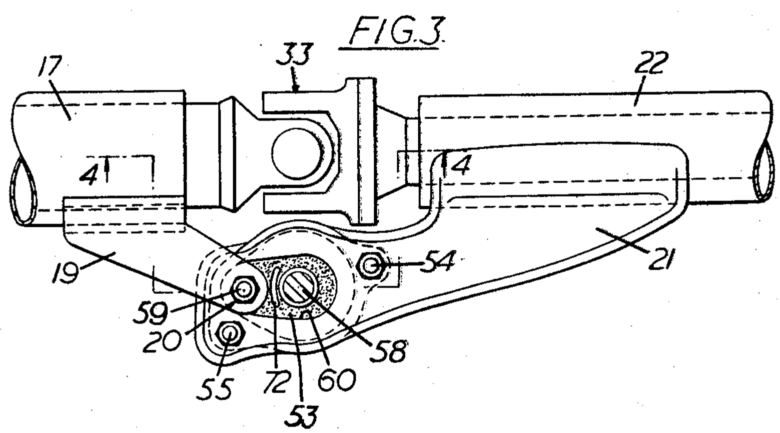
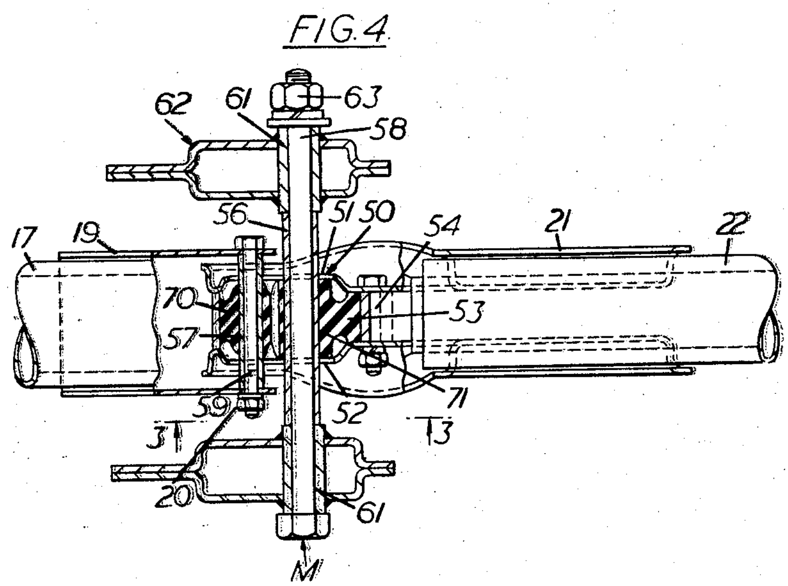
Inventors:
Jakob Adloff &
Otto Haertel
BY W. F. Wagner
Attorney

MOTOR VEHICLE DRIVE ASSEMBLIES

Filed March 31, 1961 3 Sheets-Sheet 3

INVENTORS
Jakob Adloff &
Otto Haertel
BY
W. F. Wagner
ATTORNEY

United States Patent Office 3,149,689

Patented Sept. 22, 1964

1

3,149,689
MOTOR VEHICLE DRIVE ASSEMBLIES

Jakob Adloff, Mainz-Gonsenheim, and Otto Haertel, Ruesselsheim (Main), Germany, assignors to General Motors Corporation, Detroit, Mich., a corporation of Delaware Filed Mar. 31, 1961, Ser. No. 99,753
Claims priority, application Germany Apr. 2, 1960
4 Claims. (Cl. 180—70)

This invention relates to motor vehicle drive assemblies.

It is known that the steering characteristics of a motor vehicle having a rigid live axle for the rear driven wheels can be influenced by suitable arrangement of guiding means, for example, longitudinal or diagonal control arms for the rear axle. In this way a self-steering characteristic can be obtained which is particularly useful for stabilizing a rear axle which tends to give understeering.

The present invention is concerned with a relatively cheap and simple motor vehicle drive assembly in which a self-steering characteristic is obtained with very little vertical movement of the drive shaft used to transmit torque to the rear wheels, whereby the height of the transmission tunnel for the drive shaft can be kept low. This is achieved according to the invention by means of a bearing which is located in the central portion of the vehicle and acts in the manner of a universal joint to permit pivotal and translational movement, more or less resiliently constrained, of a forward extension of an assembly comprising the rigid rear axle and a differential gear for the driven wheels.

According to one preferred feature of the invention, the bearing also forms one point of a three-point suspension for the power unit.

According to another preferred feature of the invention, the resilient support and the guiding of the rear axle are effected by leaf springs, to which the axle is connected so as to give soft springing in ride together with an anti-rolling characteristic during cornering.

The scope of the monopoly is defined by the appended claims; the invention and how it may be performed are hereinafter particularly described with reference to the accompanying drawings, which illustrate two embodiments of a motor vehicle drive assembly according to the invention and in which—

FIGURE 1 is a diagrammatic elevation of one embodiment of a motor vehicle drive assembly according to the invention;

FIGURE 2 is an elevation, similar to that shown in FIGURE 1, of a modified drive assembly according to the invention;

FIGURE 3 is an enlarged elevation of part of the drive assembly shown in FIGURE 1;

FIGURE 4 is a cross-section on the line 4—4 of FIGURE 3;

Figure 5:
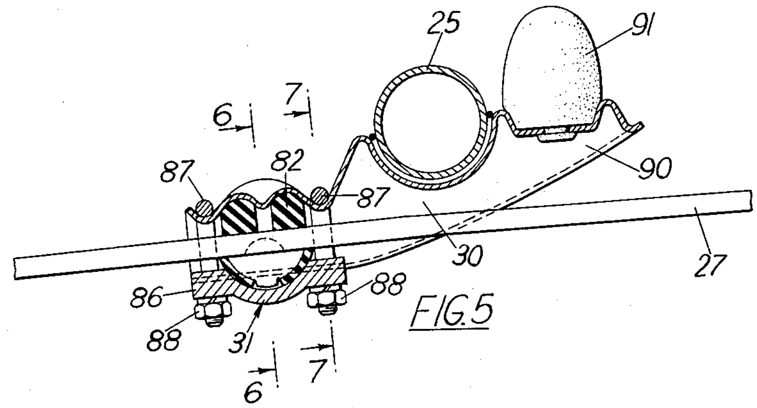
FIGURE 5 is an elevation on an enlarged scale of a rear axle mounting shown in FIGURE 1.

As shown in FIGURE 1, a power plant 10, composed of an engine 11, a clutch 12 and a transmission 13, is supported by the vehicle frame 16 by means of side arms 14 and rubber blocks 15. The side arms 14 for supporting the engine 11 are located approximately in the plane of the percussion centers of the complete power plant. The power plant 10 has a rearward extension 17 enclosing a drive shaft 18. An arm 19 attached to the rear end of the extension 17 is linked by means of a bearing 20, which will be described in detail below with reference to FIGURES 3 and 4, to a corresponding arm 21 of a forward extension 22 of a rear axle assembly 23. Thus, the rubber blocks 15 of the power plant 10 can be designed to take the weight and torque efforts only, the thrust and braking efforts being taken by the frame 16 through a fixed bearing M for the arm 21. The rear end of the extension 22 of the rear axle 23 is rigidly connected to a differential housing 24 which, in turn, is rigidly connected to axle tubes 25. The rear wheels 26 of the vehicle are adjacent longitudinal leaf springs 27 the front ends of which are pinned rigidly to the frame in bearings 28, whereas the rear ends are shackled to the frame 16 by means of shackles 29. Voluminous rubber bushings (not represented) are interposed between the ends of the springs 27 and the vehicle frame 16.

2

Each leaf spring 27 is connected to the corresponding axle tube 25 by means of a bracket 30 which extends forward from the axle tube and the front end of which is connected to the leaf spring 27 by means of a resilient mounting 31 described in detail below with reference to FIGURE 5.

The rear wheels 26 are driven from the transmission 13 through a power train consisting of a splined joint 32 from the rear of the transmission, the drive shaft 18, a universal joint 33 and an input shaft 34 for the differential.

As shown in FIGURES 3 and 4, the front end of the arm 21 of the forward extension 22 forms a housing 50 with two vertical approximately parallel walls 51 and 52. A voluminous rubber body 53 is located between the walls 51 and 52 and is held in place by bolts 54 and 55 (FIGURE 3). The rubber body 53 has two transverse apertures which receive a long spacer sleeve 56 and a short spacer sleeve 57 respectively through which bolts 58 and 59 pass. The walls 51 and 52 are provided with an elongated aperture 60 for the bolts 58 and 59 (FIGURE 3): there is thus no metallic contact between the spacer sleeves 56 and 57 and the walls 51 and 52. The longer bolt 58 extends outwardly through bores 61 of a support 62 attached to the vehicle frame and is secured by means of nuts 63. The shorter bolt 59 is attached in a similar way to the arm 19 of the extension 17.

The center line of the longer bolt 58 coincides with the imaginary axis of the centers of rotation of the resilient mountings 31; that is as shown in FIGURE 1, during flexing of the springs the resilient mounting 31 between the bracket 30 of the rear axle 23 and the leaf spring 27 describes approximately an arc $m$ of a circle with radius $r$ around the center line of the bolt 58 (bearing M).

The extensions 17 and 22 are resiliently interconnected by way of a portion 70 of the rubber body 53, and the extension 22 is resiliently connected to the frame 16 by way of a larger portion 71 of the rubber body 53. The rubber body 53 has an aperture 72 between the bolts 58 and 59 (FIGURE 3), the larger portion 71 of the rubber body 53 being so shaped as to be particularly resilient transversely to the longitudinal axis of the vehicle whereby the front end of the extension 22 is permitted some movement transversely to the longitudinal axis (lateral swinging movement) and some movement fore and aft in a horizontal plane.

This results in a self-steering characteristic of the rear axle. In addition, the flexibility of the rubber allows body roll to occur without forces being transmitted forwardly to impose undesired stresses on the engine mounting.

Figure 6:
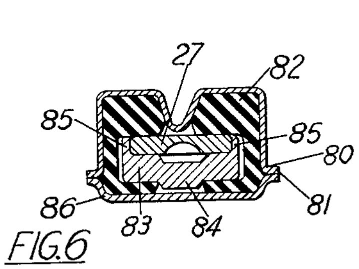
FIGURE 6 is a cross-section on the line 6—6 of FIGURE 5.
Figure 7:
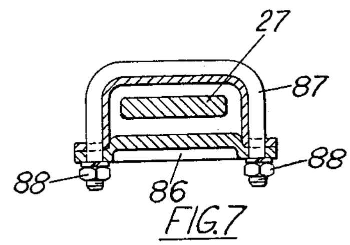
FIGURE 7 is a cross-section on the line 7—7 of FIGURE 5.
Figure 8:
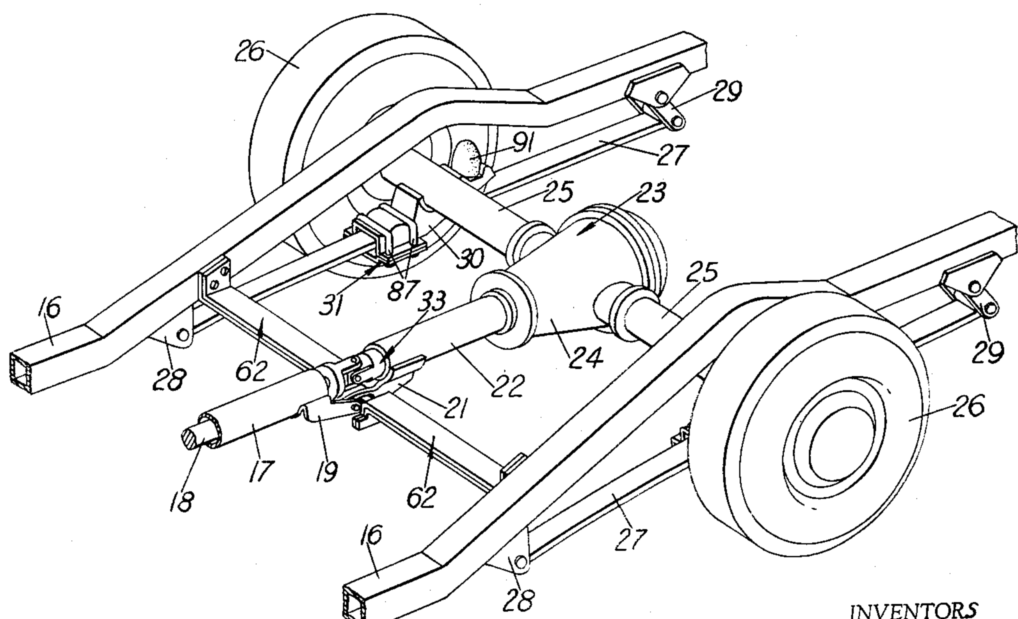
FIGURE 8 is a perspective view of a portion of the drive assembly in accordance with the invention.

As shown in FIGURES 5 to 7, each of the resilient mountings 31 has a cross-section in the form of an inverted U which grips the leaf spring 27 through the intermediary of a rubber pad 82. The U-shaped mountings 30 each have their lower edges 80 flanged at 81. A semi-cylindrical body 83 placed underneath each leaf spring 27 has a downwardly protruding lug 84 received by the rubber pad 82; the ends 85 of the body 83 engage the leaf spring 27. The mountings 30 are each enclosed and held in place by two U-shaped bolts 87 which extend through and are secured to base plate 86 by nuts 88, whereby the resilient mountings form an almost wearproof unit which needs no servicing.

As shown in FIGURE 5, the bracket 30 has a rearward extension to form a support 90 for a rubber bumper 91. The support 90 can be also used for the mounting of a telescopic shock absorber in the conventional way.

The embodiment shown in FIGURE 2 is similar to that shown in FIGURE 1 but is somewhat simpler. Like reference numerals are used for like parts. However, the extension 17 of FIGURE 1 is replaced by a reinforced vibration-proof radially rigid drive shaft 40 the front end of which is carried by a rearward extension 41 of the transmission 13. The rear end of the drive shaft 40 is connected to the input shaft 34 of the differential by means of a universal joint 42 and a splined joint 43. The engine is mounted on rubber blocks 45 which in this embodiment are designed to transmit both the torque and the drive thrust to the vehicle frame. In this embodiment the bearing 20 is omitted.

The two embodiments of a motor vehicle drive assembly which have been described are simple, since they incorporate few components, in particular few joints and few propeller shaft supports; in addition, they permit the use of a low propeller shaft tunnel, since vertical movement of the propeller shaft is limited by the position of the fixed bearing M. The steering characteristics are good: the assemblies give stabilized understeering which is accompanied by a soft ride and adequate anti-rolling characteristics. In addition, very little torque from the axle is transmitted to the springs. The insulation of the vehicles from engine noise is outstandingly good, because of the various rubber bodies incorporated in the drive assemblies between the drive components and the frame.

It will be clear from the drawings of the two embodiments of the drive assembly according to the invention that the bearing M represents one point of a three-point suspension for the rear axle, the other two points being located at the centers of rotation of bearings 31 at each side of the vehicle. Rise and fall of the rear axle is in an arc controlled by the axle springs, the voluminous rubber body in the bearing M permits not only this rise and fall but also any fore and aft movement required by the geometry of the suspension. During body roll, the rubber body permits angular movement of the front end of the forward extension about its axis as well as lateral swinging movement thereof in a horizontal plane. Attachment of the rear axle tube to the springs forwardly of the vertical plane through the wheel centers reduces the ride rate of the suspension without reducing the roll rate, so permitting independent variation of the ride and roll rates.

We claim:

1. A motor vehicle drive assembly comprising a vehicle frame, a power unit, resilient mountings interposed between the power unit and the frame, a rigid rear axle and differential assembly, resilient support and guide means between said assembly and said frame, a drive shaft extending from said power unit to said differential, a forward tubular extension on said assembly surrounding part of the length of said drive shaft, a transversely extending bearing secured in fixed relation to said frame intermediate said vehicle power unit and said assembly, and resilient means connecting the forward end of said forward tubular extension to said bearing for resiliently constrained pivotal movement of said extension about its longitudinal axis and free pivotal movement about the axis of said bearing.

2. A drive assembly according to claim 1 wherein said bearing extends beneath the projected axis of said drive shaft.

3. A drive assembly according to claim 2 wherein the vehicle power unit comprises an engine and transmission and said resilient mountings are interposed at three points one of which points is formed by said bearing.

4. A drive assembly according to claim 1 wherein the resilient support and guide means between said assembly and said frame comprise leaf springs connected to the rigid axle at points forwardly of the vertical plane passing through the wheel centers, said connections including means providing limited angular movement between the springs and axle.

References Cited in the file of this patent

UNITED STATES PATENTS

| | | |
|---|---|---|
| 1,309,676 | Ziegler | July 15, 1919 |
| 1,410,133 | Starr | Mar. 21, 1922 |
| 1,693,981 | Geyer | Dec. 4, 1928 |
| 1,697,871 | Jansson | Jan. 8, 1929 |
| 2,155,953 | Nyland | Apr. 25, 1939 |
| 2,643,111 | Burton | June 23, 1953 |